UNITED STATES PATENT OFFICE.

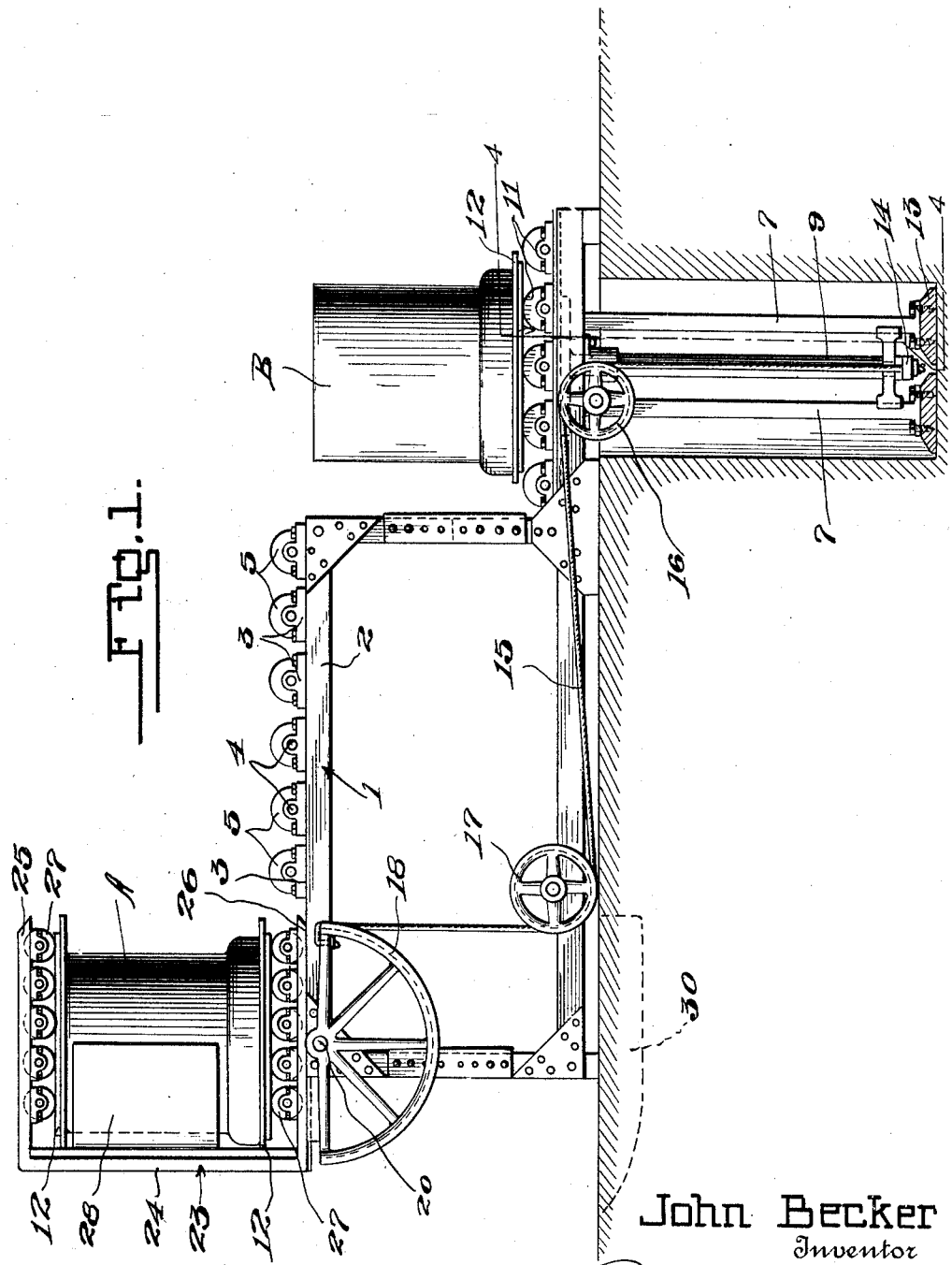

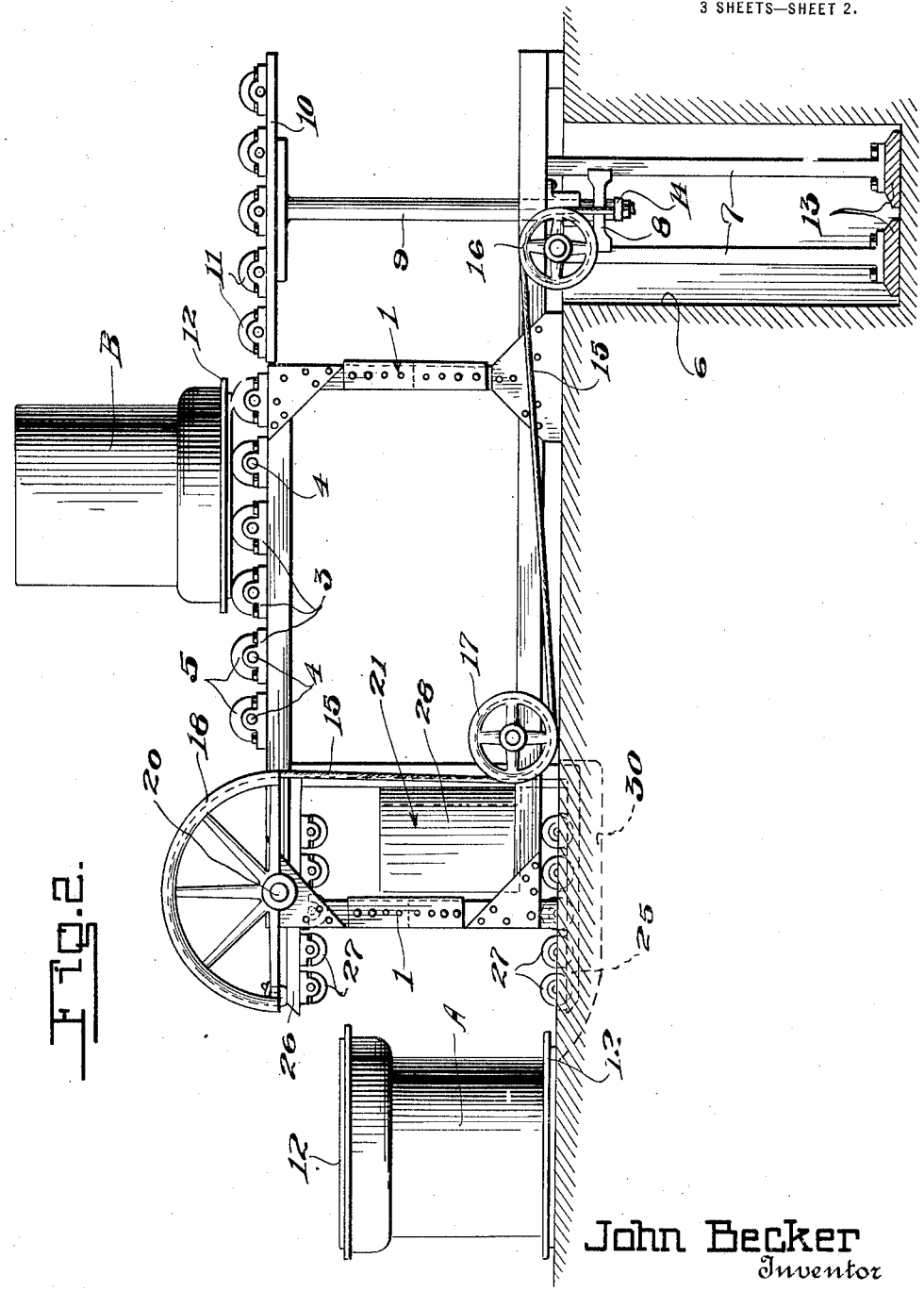

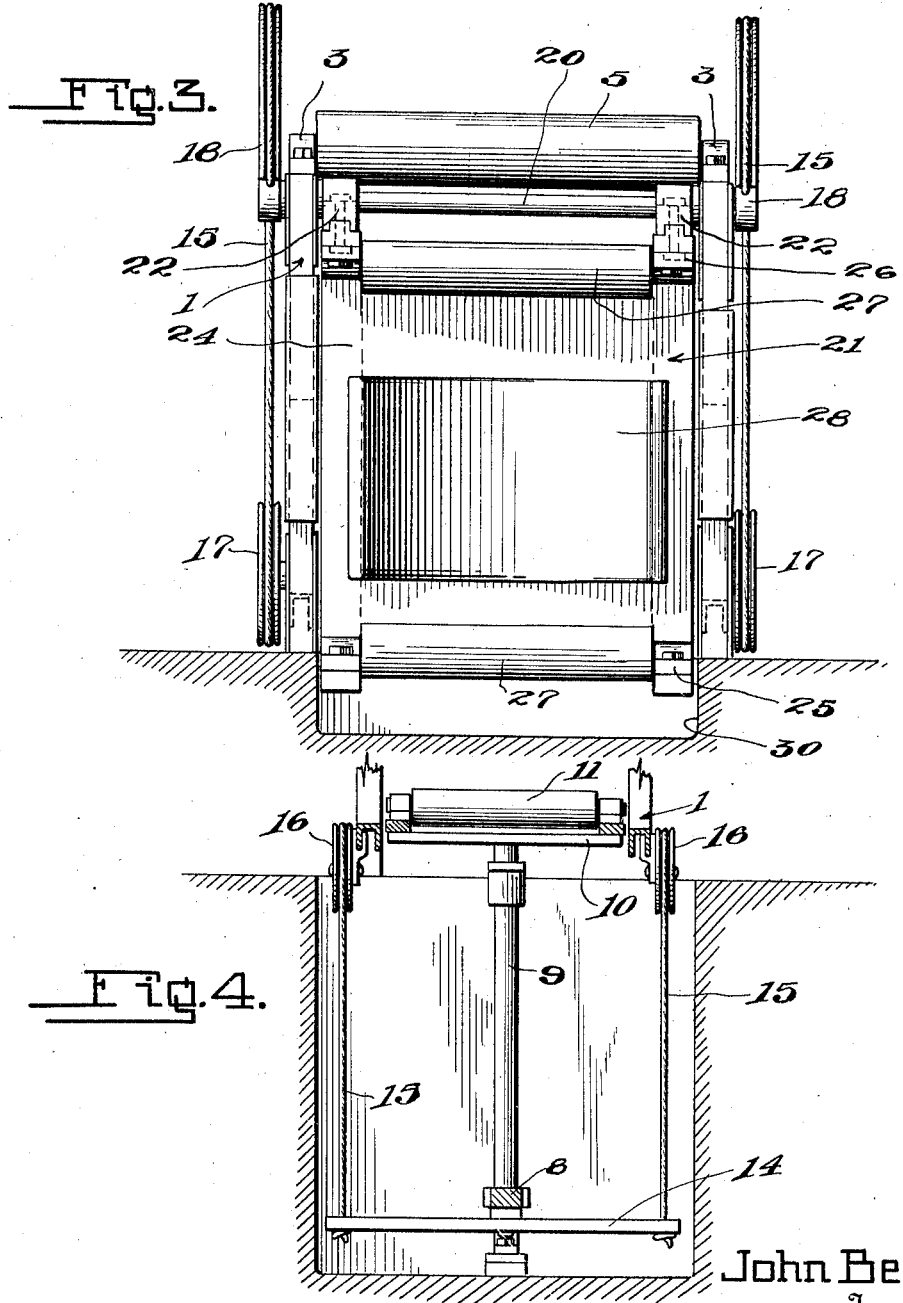

JOHN BECKER, OF MALVERN, OHIO.

PIPE-TURNER.

1,343,300.   Specification of Letters Patent.   Patented June 15, 1920.

Application filed February 19, 1919. Serial No. 277,914.

*To all whom it may concern:*

Be it known that I, JOHN BECKER, a citizen of the United States, residing at Malvern, in the county of Carroll and State of Ohio, have invented certain new and useful Improvements in Pipe-Turners, of which the following is a specification.

This invention relates to a device for turning or reversing sewer pipes when in a green state.

In the manufacture of sewer pipes or analogous pipe structures, which are made of clay or other cementitious material, the said pipe comes from the press with the socket bent down, and if allowed to stand in this position during setting or drying, the weight of the major portion of the pipe will have a tendency to distort the socket portion thereof, and it is accordingly necessary to reverse the pipes, so as to position the ring or straight end down, permitting them to dry and still maintain their proper shapes. Heretofore, it has been the usual practice to manually turn the sewer pipes, using various types of cradles to facilitate the operation, however, this usual method employs a number of men and is very laborious, making it a comparatively expensive operation in the manufacture of the pipes.

It is an object of this invention to provide a device for turning the pipes, which is so constructed, that it may be operated by one man, if desired, requiring comparatively little manual exertion to turn the pipe, the said device comprising an elevator structure upon which the pipes are placed upon removal from the press, which elevator structure elevates the pipe to a bench or table structure, the pipe carrying surface of which is composed of a plurality of rollers to facilitate the movement of the pipe thereover, and further to provide a turning member at the delivery end of the bench or table upon which the sewer pipes are mounted, and which by the imparting thereto of slight initial movement will turn and lower the pipe to the level from which it was originally raised, or to the ground or removal to the dry chest and so arrange the said turning structure and the elevator structure that the weight of a pipe, being turned by the turner structure, will elevate the second pipe for movement upon the bench or table structure.

Other objects of the invention will appear in the following detailed description taken in connection with the accompanying drawings forming a part of this specification, and in which drawings:

Figure 1 is a side elevation of the improved pipe turner.

Fig. 2 is a side elevation of the pipe turner showing the parts in different positions from that illustrated in Fig. 1.

Fig. 3 is an end view of the improved pipe turner, and

Fig. 4 is a fragmentary vertical section through the pipe turner, illustrating the elevator taken on the line 4—4 of Fig. 1.

Referring more particularly to the drawings, wherein like characters indicate like and corresponding parts throughout the several views, 1 indicates the supporting structure of the bench or table of the device, the top side rails 2 of which have a plurality of bearings 3 mounted thereon in which are journaled the spindle end for supporting the shaft 4 of a plurality of rollers 5. The supporting structure 1 may be made of any suitable material.

Positioned at one end of the supporting structure 1 is a well or pit 6, in which is positioned a pair of vertical guide rails 7, engaged by the cross head 8. This cross head 8 is connected to the lower end of the shaft or post 9 of the elevator structure. The platform 10 of the elevator structure, which is positioned upon the upper end of the post 9 has a plurality of rollers 11 rotatably supported thereon and forming a surface upon which the pile or pipe may be rolled or moved as it comes from the mold or press. The pipe, indicated at A, rests upon the supporting board 12 which engages the rollers 11. Any suitable type of foundation or support 13 may be placed in the bottom of the pit 6 for supporting the guide rails 7.

An arm 14 is attached to the post 9 near its lower end and projects upon each side of the post, having cables 15 connected to its ends. The cables 15 pass upwardly over sheaves 16 which are rotatably supported at the mouth of the pit 6 and also about guiding sheaves 17 which are rotatably carried by the supporting structure 1. The ends of the cables 15 opposite to those which are connected to the arm 14 are connected to semi-sheaves 18. The semi-sheaves 18 are keyed upon a shaft 20. The shaft 20 is rotatably supported at the upper corner of the supporting structure 1 remote from the end at which the elevator structure is positioned as clearly shown in Figs. 1 and 2 of the drawings.

A pipe turning member, generically indicated by the numeral 21 is connected to the shaft 20 by suitable connecting block structure 22 and this turning member comprises a main body structure 23 including an upright 24 and horizontal portions 25 and 26 positioned at the ends of the upright portion 24. These horizontal portions 25 and 26 carry, upon their facing sides a plurality of rollers 27, the upper surfaces of which are flush with the upper surfaces or uppermost portion of the rollers 5 as shown in Fig. 2 of the drawings, when the turning structure 21 is in a pile or pipe receiving position.

A substantially semi-cylindrical saddle 28 is carried by the upright portion 24 and engages a portion of the outer surface of the pipe when the latter is positioned in the turning structure. In the operation of the improved pipe turning device; the pipe as it comes from the mold or press, together with its carrying boards 12 is first moved upon the rollers 11 of the elevator structure and in the initial operation of the device, is raised, in any suitable manner, so that the uppermost portions of the rollers 11 will be flush with the uppermost portions of the rollers 5 after which the tile A is moved off the rollers 11 upon the rollers 5 of the bench structure. When the elevator structure is at its uppermost position, the turning structure 21 is at its downward position as indicated in Fig. 2 of the drawings. After the first tile has been placed upon the rollers 5 of the bench structure, the elevator structure is lowered and a second or subsequent pipe is moved upon the elevator structure, as shown at B in the Fig. 1 of the drawings, while the first pipe A is moved from the bench structure into the turning structure 21. Prior to the moving of the first pipe structure A into the turning structure, a second board 12 is placed upon the upper end of the pipe A and this board engages the rollers 27 carried by the horizontal sides 25 of the turning structure, while the lower board 12 engages the roller 27 carried by the lower side 26 of the turning structure. After the pipe A is properly positioned in the turning structure, resting in the saddle 28 and the pipe B has been properly placed upon the elevator structure, a slight movement may be imparted to the shaft 20 through the medium of one of the semi-sheaves 18 and this will start the turning structure 21 carrying the pipe A downwardly, about the shaft 20 as in action. Owing to the fact that the turning structure practically counter-balances the elevator structure, the weight of the downward movement of the turning structure, together with the pipe A carried thereby will, through the medium of the cables 15 raise the elevator structure, moving the pipe B into position for being moved off the rollers 11 and the elevator structure upon the rollers 5 of the bench structure. The relatively shallow pit indicated at 30 is provided, so that the horizontal portions 25 of the turning structure will move thereinto when the turning structure is lowered, permitting the pipe to be rolled or moved on the rollers 27 carried by the side or section 25, upon the ground or other surface upon which the pipe turning mechanism is mounted. After the pipe A has been moved out of the turning structure and the pipe B moved off the elevator structure upon the bench rollers 5, the turning structure may be moved to its pipe receiving position as shown in Fig. 1 of the drawings, during which movement the elevator structure will be lowered. The movement of the pipe turning structure into a receiving position, may be accomplished by one man owing to the counterbalancing of the weight of the turning structure of the elevator structure.

From the foregoing description, taken in connection with the accompanying drawings, it will be apparent that a turning device for sewer pipes has been provided which will require the services of not more than two men and also will require a minimum amount of manual exertion to properly turn the sewer pipes so that they will rest upon the straight or ring end, positioning the socket ends upwardly for drying.

Changes in details may be made without departing from the spirit of this invention, but:

I claim:

1. In a pipe turner, the combination, of a supporting bench, an elevator structure positioned at one end of the bench to elevate the pipes to the level of the bench, a turning structure at the other end of the bench and adapted to receive pipes from the bench, said turning structure mounted to turn in a half circle and lower the pipes in a reversed position substantially to the level from which they were elevated by the elevator structure.

2. In a pipe turner, the combination, of a supporting bench, an elevator structure positioned at one end of the bench to elevate the pipes to the level of the bench, a turning structure at the other end of the bench and adapted to receive pipes from the bench, said turning structure mounted to turn in a half circle and lower the pipes in a reversed position substantially to the level from which they were elevated by the elevator structure, and means connecting the turning structure and the elevator structure for simultaneous operation.

3. In a pipe turner, the combination, of a bench, means for elevating pipes to the level of the bench top, pipe turning means positioned for receiving the pipes from the bench and reversing them, and means for connecting said elevator means and said turning means to simultaneously operate them.

4. In a pipe turner, the combination, of a bench, means for elevating pipes to the level of the bench top, a pipe turning means positioned for receiving the pipes from the bench and reversing them, the weight of said turning means and elevating means being substantially equal, whereby one will counterbalance the other, and means connecting said elevating means and said turning means for simultaneous operation.

5. In a pipe turner, the combination, of a supporting bench, an elevator structure positioned at one end of the bench to elevate the pipes to the level of the bench top, a turning structure at the other end of the bench and adapted to receive pipes from the bench, said turning structure mounted to turn in a half circle and lower the pipes in a reverse position to substantially the position from which they were elevated by the elevator structure, rollers rotatably carried by the bench top and rollers carried by the pipe supporting surfaces of said elevator and turning structure.

6. In a pipe turner, the combination of a supporting bench, an elevator structure arranged to elevate the pipes to the level of the bench, a turning structure adapted to receive the pipes from the bench, and means for simultaneously operating the elevator structure and turning structure.

7. In a pipe turner, the combination of a supporting bench, an elevator structure arranged to elevate the pipes to the level of the bench, and means for turning and lowering the pipes to substantially the level from which they were elevated by the elevator structure.

8. In a pipe turner, the combination, of a bench, an elevator structure for elevating pipes to the level of the bench top, said elevator structure comprising guiding means, a platform carried by the upper end of said guiding means, a plurality of rollers rotatably supported by said platform and forming the pipe supporting surface thereof, pipe turning means positioned for receiving pipes from the bench and reversing them and means for connecting said turning means and said elevator structure for synchronously operating them.

9. In a pipe turner, the combination of a supporting bench, an elevator structure arranged at one end of the bench, and arranged to elevate the pipes to the level of the bench, a turning structure arranged at the opposite end of the bench and arranged to turn and lower the pipes to substantially the level from which they were elevated by the elevator structure.

10. In a pipe turner, the combination, of a bench, means for elevating pipes to the level of the bench top, a shaft rockably carried by the bench, a pipe turning structure carried by said shaft and adapted to extend above the bench top to receive pipes therefrom and to move downwardly, to reverse the position of the pipes and means connecting said shaft and said elevator means for synchronous operation.

11. In a pipe turner, the combination of a supporting bench, an elevator structure arranged at one end of the bench and arranged to elevate the pipes to the level of the bench, means for turning and lowering the pipes to substantially the level from which they are elevated by the elevator structure, and means for connecting the elevator structure and turning structure for simultaneous movement.

12. In a pipe turner, the combination, of a bench, means for elevating pipes to the level of the bench top comprising guiding means, a pipe supporting platform, a shaft rockably carried by said pipe structure, pipe turning means connected to said shaft, and adapted to extend above the bench top to receive pipes therefrom and to swing in a half circle about said shaft as an axis to reverse the pipe, and means connecting said shaft and said guiding means for operating the elevating structure synchronously with operation of the pipe turning structure.

13. In a pipe turner, the combination, of a supporting bench, an elevator structure positioned at one end of the bench to elevate pipes to the level of the bench, a turning structure at the other end of the bench and adapted to receive pipes from the bench, a supporting shaft for said turning structure rockably carried by the bench, said elevator structure normally resting at a level below the top of said bench when in a pipe receiving position, said turning structure normally extending above the bench top to receive pipes therefrom, the weight of said pipe turning means and said elevator structure being substantially equal, whereby one will counterbalance the other, and means connecting the elevating structure and the turning structure whereby when the turning structure moves downwardly upon said shaft as a pivot, said elevating structure will move upwardly to elevate a pipe to the level of the bench top.

14. In a pipe turner, the combination, of a supporting bench, an elevator structure positioned at one end of the bench to elevate pipes to the level of the bench, a turning structure at the other end of the bench and adapted to receive pipes from the bench, a supporting shaft for said turning structure rockably carried by the bench, said elevator structure normally resting at a level below the top of said bench when in a pipe receiving position, said turning structure normally extending above the bench top to receive pipes therefrom, the weight of said pipe turning means and said elevator structure being substantially equal, whereby one will counter-balance the other, and means connecting the elevating structure and the turning structure whereby, when the turning structure moves downwardly upon said shaft as a pivot, said elevating structure will move upwardly to elevate a pipe to the level of the bench top, rollers rotatably carried by the bench structure and forming the top pipe supporting surface thereof, and the rollers rotatably carried by the pipe supporting surface of said elevator and turning structure.

15. In a pipe turner, the combination, of a supporting bench, an elevator structure positioned at one end of the bench to elevate pipes to the level of the bench, a turning structure at the other end of the bench and adapted to receive pipes from the bench, a supporting shaft for said turning structure rockably carried by the bench, said elevator structure normally resting at a level below the top of said bench when in a pipe receiving position, said turning structure normally extending above the bench top to receive pipes therefrom, the weight of said pipe turning means and said elevator structure being substantially equal, whereby one will counter-balance the other, and means connecting the elevating structure and the turning structure whereby, when the turning structure moves downwardly upon said shaft as a pivot, said elevating structure will move upwardly to elevate a pipe to the level of the bench top, rollers rotatably carried by the bench structure and forming the top pipe supporting surface thereof, and the rollers rotatably carried by the pipe supporting surface of said elevator and turning structure, and a substantially semi-cylindrical saddle carried by said turning structure.

JOHN BECKER.